METHOD FOR PRODUCING THIN SEMICONDUCTING LAYERS OF SEMICONDUCTOR COMPOUNDS

Filed Jan. 2, 1962

United States Patent Office 3,172,778
Patented Mar. 9, 1965

3,172,778
METHOD FOR PRODUCING THIN SEMICONDUCTING LAYERS OF SEMICONDUCTOR COMPOUNDS

Karl-Georg Günther and Helmut Freller, Nurnberg, Germany, assignors to Siemens-Schuckertwerke Aktiengesellschaft, Erlangen, Germany, a German corporation
Filed Jan. 2, 1962, Ser. No. 164,224
Claims priority, application Germany, Jan. 3, 1961, S 71,923
4 Claims. (Cl. 117—213)

Our invention relates to the production of thin semiconducting layers. Such layers or wafers are often needed as electronic semiconductor members. For example the so-called Hall plates are often produced by depositing a thin coating of semiconductor substance on a pole face of a magnetizable structure adjacent to, or within, an extremely narrow interpole gap.

When semiconducting layers are to be prepared from elemental substances, they can be produced simply by vaporizing the element in vacuum onto a carrier. However, the production of thin layers, by vaporization, encounters difficulties when the layer is to consist of a semiconducting compound, particularly a compound whose constituents above the melt of the compound have considerably different vapor pressures. This applies particularly to some of the so-called $A_{III}B_{V}$ compounds, i.e. compounds formed of an element from the third group (boron, aluminum, gallium, indium) of the periodic system with an element from the fifth group (nitrogen, phosphorus, arsenic, antimony). These substances are: BN, BP, BAs, AlN, AlAs, AlSb, GaN, GaP, GaAs, GaSb, InN, InP, InAs and InSb.

According to a known method of producing thin semiconducting layers of semiconductor compounds, described in U.S. Patent No. 2,938,816 of Günther, the carrier or recipient surface which is to receive the vaporization-deposited layer of the compound is kept, during the vaporization process, at a temperature which is between the condensation temperature of the constituent of higher volatility, on the one hand, and the condensation temperatures of the constituent of lesser volatility and of the compound on the other hand. Furthermore, the density of the beam of vapor impinging upon the recipient is advantageously so rated as to provide in front of the recipient an excess of the constituent of higher volatility.

It has also been proposed, for obtaining a coarsely crystalline structure, to conduct the temperature of the collector and/or the impinging densities of the vaporized components in such a manner that in the initial phase of the evaporation a smallest number of condensation seeds or centers can form themselves and in the final phase as many molecules of the compound as possible will become condensed.

It is an object of our invention to provide a method that affords the production of thin layers of semi-conductor compounds by separate vaporization of the compound-forming components.

To this end, and in accordance with a feature of our invention, we subject the carrier, after thorough cleaning, to pre-seeding with condensation seeds or centers in a preferred direction. This is done, for example, by wiping readily decomposable carbon compounds in strips upon the carrier surface or by depositing shallow grinding grooves on the carrier surface.

The carrier may consist of sintered corundum, hard glasses and ferritic material, such as manganese ferrite, free of ZnO or similar, readily reducible oxides. The preheating of the carriers, the decomposition of the condensation seeds placed upon the carrier surface, the vapor deposition upon the carrier plates, the cooling and checking measurements are preferably performed continuously within one and the same vaporization equipment which may be such as that described in above-mentioned Patent No. 2,938,816.

The use of ferritic carriers, free of ZnO or similar, readily reducible oxides, as a support for the layers to be deposited, is particularly advantageous in order to avoid, during the vaporization process, a superficial reduction and thereby the formation of a conductive ferrite layer beneath the vapor deposited layer. Another advantage is the fact that the diffusion of impurities into the vapor deposited semiconductor layer is prevented. Such impurities being apt to act as ionized defection points. The invention affords the production of semiconductor elements which can be employed where extremely small thickness is essential, for example where it is desirable to employ these semiconductor elements in extraordinarily narrow air gaps or pole gaps.

The pre-seeding of the carrier plates in a preferred direction according to the invention, this direction normally being in the flow direction of the control current, has the effect of producing long crystallites of several $10^2$ microns oriented in the preferred direction. The direction of the control current, just mentioned, is the one in which an electric current will normally pass through the finished semiconductor layer, such as a Hall plate, when the plate is subsequently placed in normal operation. As a rule, a Hall plate has a rectangular cross section and is provided with current supply terminals at the two narrow sides so that the current flows lengthwise through the plate. This lengthwise current flow being the preferred current flow direction and consequently the preferred orientation for pre-seeding. As a result of the invention, the electric resistance of the layer thus produced is diminished, corresponding to an increase in carrier mobility as well as in current-carrying capacity of the semiconductor elements. Particularly favorable results are obtained when the carrier, after leaving the vaporization zone, is cooled in the shortest possible time, preferably within one to two minutes. In this manner a reverse vaporization of the readily volatile component is avoided.

The manufacture of vaporized layers is generally advantageously carried out with the following further considerations in mind. The determined or selected entering density of the vapor of the less volatile component, for example, of the indium in the manufacture of layers of InAs, InSb and InP, or of the gallium in the manufacture of layers of GaAs or GaP, is such that the layers can be built up in a thickness of a few microns within a few minutes. This requires impinging densities of $10^{17}$ to $10^{18}$ particles per second and per $cm.^2$. The required vaporizing temperatures are determined by the vapor-pressure curves of the respective elements. For example, with indium, one needs temperatures of 900° C. to 1000° C., depending upon the geometric arrangement. The temperature of the vaporizer containing the more volatile component, for example arsenic or antimony, is chosen so that the impinging density thereof, at the recipient, is preponderant relative to the impinging density of the less volatile component. The magnitude of this excess in density may vary between about twice and ten times the impinging density of the less volatile component. For example, with arsenic, temperatures between 300° C. and 350° C. and, with antimony, temperatures between 700° C. and 800° C. are applicable.

The temperature of the recipient surface is kept below the melting temperature of the compound to be used and also below the vaporizing temperature of the more volatile component above the compound. The recipient temperature, in the manufacture of InAs and GaAs, is between 200 and 700° C. In the manufacture of InSb, the recipient temperature is between 400 and 530° C.

The method of the invention is particularly suitable for the production of Hall plates of very thin layers with high sensitivity from semiconducting compounds of the $A_{III}B_V$ type, particularly InAs and InSb.

Figure 1:
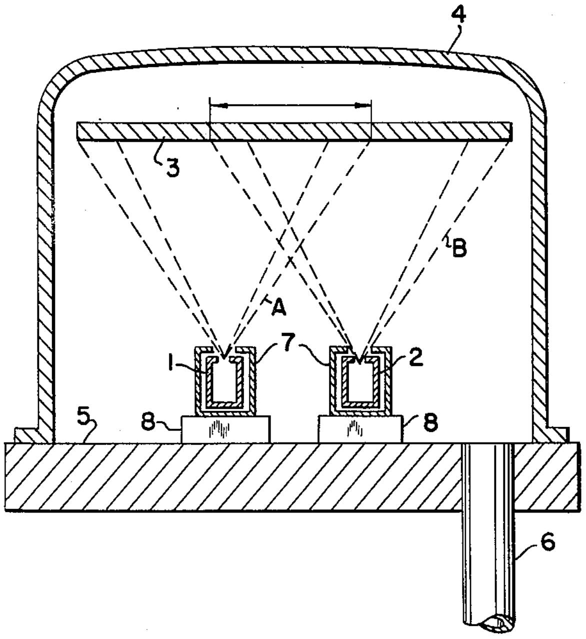
FIG. 1 shows a vapor device of Gunther Patent No. 2,938,816.

In FIG. 1, two vaporizer vessels denoted by 1 and 2 are provided from which the constituents A and B respectively are vaporized onto a recipient of preferably flat planar carrier sheet 3 in order to form therein a semiconductor device consisting of the compound AB. The entire device is located within a vacuum vessel 4. The vessel 4 is disposed upon or fixed on a base plate 5 having a suction conduit 6 connected therein. Shown at 7 are the heating devices for evaporator vessels 1 and 2. Heaters 7 are mounted upon the ceramic bases 8. The heaters 7 comprise cylinder-shaped incandescent sheet metal members. The effective receiving area of the carrier 3, in which the compound is to be produced, is located within the common or overlapping impinging range of both component vapor means and is identified on the joint by a double-headed arrow. The vapor beams A and B may have their axis parallel to each other or inclined to each other. Beam A may be adjusted asymmetrically, if desired, to accentuate or modify the decrease and impinging intensity on surface 3, from the left to the right, in the overlapped portion. The apertures of vessels 1 and 2 can be circular or transverse parallel slits.

Figures 2, 3:
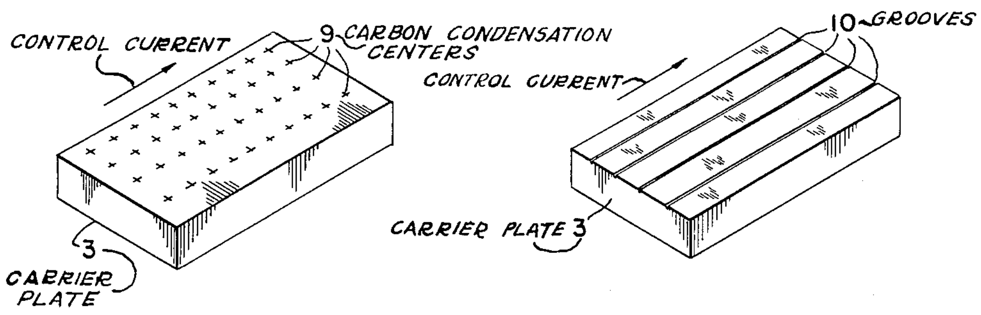
FIGS. 2 and 3 show a cut-out view of a pretreated carrier plate according to the process of the present invention.

In FIGS. 2 and 3 the direction of the current is shown by a single-headed arrow. In FIG. 2 the carrier plate 3 has upon it carbon condensation centers 9 and in FIG. 3 the carrier plate 3 has grooves 10 ground therein.

The invention will be further described with reference to the following example.

The method according to the invention can be employed for vapor-depositing polycrystalline InAs or InSb layers for the production of Hall plates for signal or measuring purposes. Hard glass whose thermal coefficient of expansion was approximately the same as that of the semiconductor compound was used as the carrier plate. The same method is also applicable to carrier plates of sintered corundum and zinc-free iron-manganese ferrite. The surfaces of the carrier were polished so that the depth of the remaining roughness was less than one micron. The carrier plates were first cleaned with a fat-dissolving solvent, preferably acetone, and thereafter annealed in air at a temperature of 500 to 800° C. The plates were then pre-seeded by wiping, onto the surface of the plates in the direction of the control current as explained above, a carbon compound, namely benzol, which contained traces of high-boiling mineral-oil fractions. The wiping was done with a piece of felt and also with a particularly fine-haired glass-fibre brush. Another suitable method was to grind channel grooves having less than 0.1 micron depth, into the surfaces in the preferred direction with the aid of finest-grain abrasive powder.

After the above-described pre-seeding treatment, the carrier plates were introduced into the vaporizing apparatus and heated at 800° C. so that, after decomposition, only carbon condensation centers remained on the treated surfaces. After cooling to temperatures of about 700° C., the surfaces were simultaneously subjected to vapor supplied from an indium vaporizer and an arsenic vaporizer. The vaporizer temperatures were at $T_1$=1000° C. for indium and $T_2$=350° C. for arsenic. The vaporization was continued until the desired layer thickness was attained, this thickness being between 0.5 and 5 microns, as a rule. After removal of the plate from the vaporization zone, the plates were cooled within one to two minutes to temperatures below 300° C. thus preventing a back evaporation of the readily volatile component out of the precipitated layer.

Obviously many modifications and variations of the present invention are possible in the light of the above teachings. It is therefore to be understood that within the scope of the appended claims, the invention may be practiced otherwise than as specifically described.

We claim:

1. The method for producing upon a carrier a thin semiconductor layer of a semiconducting compound whose components in molten condition have different vapor pressures respectively, which comprises cleaning a carrier and pre-orienting the surface of said carrier in a preferred direction by grinding grooves on said carrier surface in the direction of the electric current which is to pass through the carrier when subsequently in normal use, and thereafter simultaneously vapor depositing the components upon said pre-oriented carrier surface, said carrier surface being at a temperature between the condensation temperatures of the component of higher volatility and of lower volatility respectively, the impinging density of the vapor beam of the component of higher volatility on said carrier surface being such as to maintain at said pre-oriented carrier surface a stoichiometric excess of the component of higher volatility.

2. The method for producing upon a carrier a thin semiconductor layer of a semiconducting compound whose components in molten condition have different vapor pressures respectively which comprises cleaning a carrier with a fat-dissolving solvent, pre-orienting said carrier in a preferred direction by wiping a readily decomposable carbon compound onto said carrier in the direction of the control current which is to pass through the carrier when subsequently in normal use, preheating said wiped carrier so that only carbon condensation centers remain on said carrier, thereafter simultaneously vapor depositing the components upon said pre-oriented carrier surface, said pre-oriented carrier surface being at a temperature between the condensation temperatures of the component of higher volatility and of lower volatility respectively, the impinging density of the vapor beam of the component of higher volatility on said carrier surface being such as to maintain at said pre-oriented carrier surface a stoichiometric excess of the component of higher volatility, and cooling said vapor deposited carrier in the shortest possible time.

3. The method for producing upon a carrier a thin semiconductor layer of an $A_{III}B_V$ semiconducting compound whose components in molten condition have different vapor pressures respectively which comprises cleaning a carrier with acetone, pre-seeding said carrier by wiping benzol onto said carrier in the direction of the control current which is to pass through the carrier when subsequently in normal use, preheating said wiped carrier so that only carbon condensation centers remain on said carrier, thereafter simultaneously vapor depositing the components upon said pre-seeded carrier surface, said pre-seeded carrier surface being at a temperature between the condensation temperature of the component of higher volatility and of lower volatility respectively, the impinging density of the vapor beam of the component of higher volatility on said carrier surface being such as to maintain at said pre-seeded carrier surface a stoichiometric excess of the component of higher volatility, and cooling said vapor deposited carrier in about one minute.

4. The method for producing a Hall plate by precipitating upon a carrier a thin semiconductor layer of an $A_{III}B_V$ semiconducting compound selected from the group consisting of InAs and InSb and whose components in molten condition have different vapor pressures respectively, which comprises cleaning a carrier with acetone, pre-seeding said carrier by wiping benzol onto said carrier in the direction of the control current which is to pass through the carrier when subsequently in normal use, preheating said wiped carrier so that only carbon condensation centers remain on said carrier, thereafter simultaneously vapor depositing the components upon said pre-seeded carrier surface, said pre-seeded carrier surface being at a temperature between the condensation temperature of the component of higher volatility and of lower volatility respectively, the impinging density of the vapor beam of the component of higher volatility on said carrier surface being such as to maintain at said pre-seeded carrier surface a stoichiometric excess of the component of higher volatility, and cooling said vapor deposited carrier in about one minute.

References Cited by the Examiner

UNITED STATES PATENTS

| | | | |
|---|---|---|---|
| 2,759,861 | 8/56 | Collins et al. | 148—1.5 |
| 2,968,583 | 1/61 | Barth | 117—213 |
| 3,015,587 | 1/62 | MacDonald | 117—213 |
| 3,065,112 | 11/62 | Gilles et al. | 117—213 |

FOREIGN PATENTS

| | | |
|---|---|---|
| 307,775 | 8/55 | Switzerland. |
| 1,041,582 | 10/58 | Germany. |
| 1,057,845 | 5/59 | Germany. |

RICHARD D. NEVIUS, *Primary Examiner.*